June 10, 1958 W. G. HARVEY 2,837,765
KNOCKOUT MECHANISM FOR MOLDING MACHINE
Filed March 17, 1954 2 Sheets-Sheet 1

INVENTOR.
WILFRED G. HARVEY
BY
ATTORNEYS

June 10, 1958 W. G. HARVEY 2,837,765
KNOCKOUT MECHANISM FOR MOLDING MACHINE
Filed March 17, 1954 2 Sheets-Sheet 2

INVENTOR
WILFRED G. HARVEY
BY
ATTORNEYS

2,837,765
KNOCKOUT MECHANISM FOR MOLDING MACHINE

Wilfred G. Harvey, Leominster, Mass.

Application March 17, 1954, Serial No. 416,785

6 Claims. (Cl. 18—16)

In the manufacture of molded parts by injection molding knockout pins are provided to eject the molded part from the cavity as the mold platen opens, but in fully automatic operations it is desirable to eject the molded part after the movable platen has come to a complete stop, and in some cases it is advisable, if not necessary, to carry out the ejection in a two-stage operation.

The principal objects of the present invention are to provide a reliable and efficient knockout mechanism which can be advantageously used in both non-automatic and fully automatic molding operations embodying either a single stage or a two-stage ejection operation, and to provide a knockout mechanism which permits the use of an automatic discharge device such as shown in my copending application Serial No. 395,472, filed December 1, 1953.

Further objects will be apparent from a consideration of the following description and the accompanying drawings; wherein.

In accordance with the present invention my improved molding machine comprises a fixed platen and a movable platen which may be provided with an ejector member or the like arranged to act on the stripper of a mold carried thereby, as in conventional molding machines disclosed more fully in such standard texts as the Handbook of Plastics by Simonds and Ellis (D. Van Nostrand). A clamp cylinder has a piston provided with a hollow or tubular piston rod which may act directly on the movable platen or through toggle links or the like mechanism effective to reciprocate the movable platen in response to reciprocation of the clamp piston.

An auxiliary cylinder coaxial with and mounted adjacent to the outer end of the clamp cylinder has a piston provided with a piston rod which extends through the tubular piston rod of the clamp piston and its outer end may act either directly on the stripper of the mold or by engagement with an ejector member carried by the movable platen, but in either case it is operative to effect the stripping action. Suitable manual or automatic controls are provided for admitting and discharging fluid pressure to and from the cylinders, thereby controlling the operation of the machine either for a single or two-stage ejection.

Where the machine is designed for semi or fully automatic operation, the control means are preferably associated with an automatic discharge such as disclosed in my aforementioned copending application Serial No. 395,472, to which reference may be had for a more detailed description of the construction and operation of the mechanism, but in any event the molding machine may be automatically operated with either a single or two-stage ejection.

Figure 2:
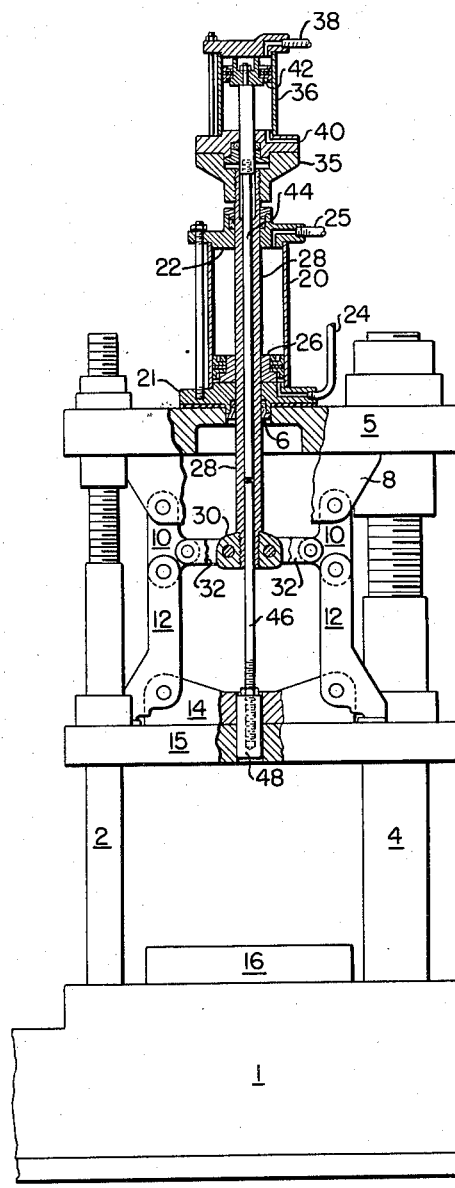
Fig. 2 is a front elevation with parts shown in section of the machine shown in Fig. 1 with the adjustable operating rods for the stripper plate omitted.
Figure 1:
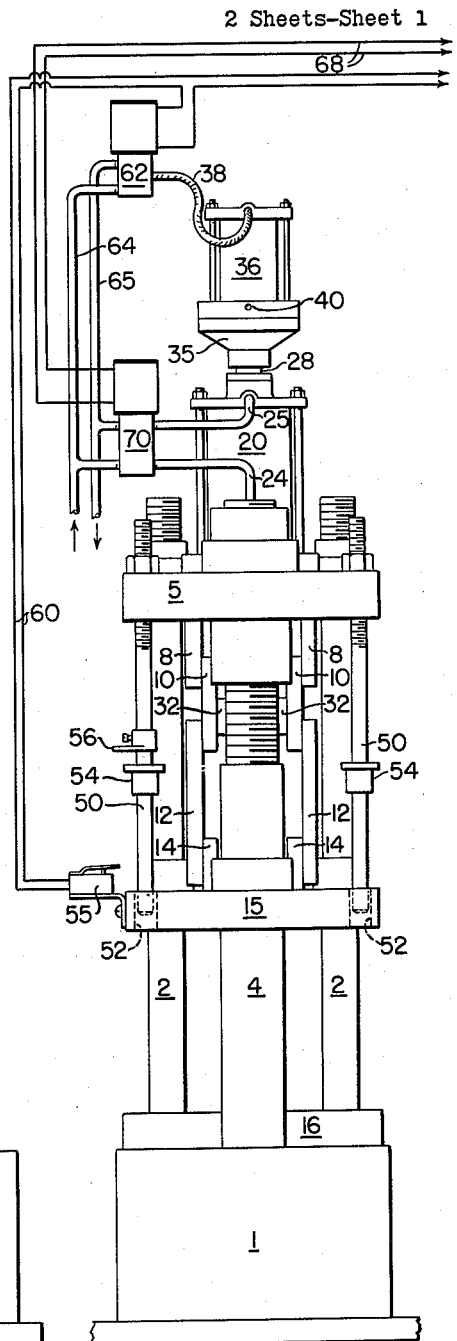
Fig. 1 is an end elevation of an ejection molding machine having a knockout mechanism constructed in accordance with the present invention, the platen being shown in closed position.

The embodiment herein shown for the purpose of illustration is a fully automatic injection molding machine equipped with a mold designed for two-stage ejection, and as shown in Figs. 1 and 2 the machine comprises a base 1 which supports a plurality of pairs of upright posts 2 and 4 which in turn adjustably support a head 5 having a central opening 6 (Fig. 2). Depending brackets 8, fixed to the underside of the head 5, support the upper links 10 of two pairs of toggle links, the lower links 12 being pivotally connected to upstanding brackets 14 fixed to the upper or movable platen 15, the construction and arrangement of parts being such that inward and outward movement of the links elevates and lowers the movable platen 15 relative to the fixed platen 16 carried by the base 1.

Mounted on the head 5 is a clamp cylinder 20 having its opposite ends 21 and 22 provided with fluid pressure openings communicating with pressure lines 24 and 25. Within the cylinder 20 is a clamp piston 26 fixed to a hollow or tubular piston rod 28, the opposite ends of which project beyond the ends of cylinder 20, it being understood that the usual packing glands are provided to prevent the escape of fluid.

The lower or inner end of the piston rod 28 has a threaded connection with a member 30 having pivotal connections with the inner ends of links 32, the opposite ends of which are pivotally connected to the upper links 10 of the toggles. With this construction and arrangement of parts fluid pressure admitted through line 24 to the inner end of the cylinder forces the piston 26 upwardly and piston rod 28 draws the toggle links inwardly to elevate the movable platen 15, and when fluid pressure is admitted through line 25 the reverse action takes place, thereby closing the press.

The upper end of the rod 28 has a threaded connection with a conical member 35 which supports an auxiliary cylinder 36, the opposite ends of which have openings, the upper opening communicating with a flexible pressure line 38 and the lower opening 40 providing a vent to the atmosphere. Within the auxiliary cylinder 36 is an ejector-operating piston 42 having a piston rod 44 which extends downwardly through the member 35 and the axial opening in the rod 28 so as to engage the upper end of an ejector rod or plunger 46 provided with an enlarged end 48 having a sliding fit in a central opening in the movable platen 15.

The cylinder 36 and associated parts are carried upwardly and downwardly by the rod 28 as the piston 26 reciprocates, but when the platen 15 is closed, as shown in Fig. 2, the piston 42 is normally maintained in elevated position, as hereinafter more fully explained. Upon the admission of fluid pressure through line 38, the piston 42 is forced downwardly to act on the ejector plunger 46 which in turn operates the stripper of a mold carried by the platens 15 and 16.

Where, as here shown, the machine is designed for fully automatic operation with two-stage ejection, the head 5 is provided with a plurality of spaced depending adjustable rods 50 which pass through openings 52 in the platen 15 so as to be engageable with the stripper plate of the mechanism (hereinafter described) when the platen 15 moves to open position, thereby to effect the first stage ejection operation. Mounted on the rods 50 are flanged collars 54 which provide stops engageable with the upper face of the platen 15 to limit its upward movement.

Automatic operation is effected by a control system comprising a limit switch 55 carried by the platen 15 and having an operating lever engageable with an adjustable finger 56 carried by one of the rods 50, the arrangement of parts being such that the switch 55 closes when the platen 15 is elevated to open position. The switch 55 is connected in a circuit 60 which includes a solenoid-operated valve 62 connected to pressure line 38, a supply line 64 and an exhaust line 65. An associated circuit 68 includes the usual timers and relays, as described in my copending application Serial No. 395,472 and also copending application Serial No. 390,883, filed November 9, 1953, and the circuit 68 also includes a solenoid-operated four-way valve 70 connected with pressure lines 24 and 25, supply line 64 and exhaust line 65.

These circuits are so designed that upon initiation of the impulse that resets and starts the timers, the valve 70 is operated to close the press, after which the thermoplastic is admitted to the mold cavity as described in copending application Serial No. 390,883, and upon completion of the molding operation the valve 70 is again operated to admit fluid pressure through line 24 which opens the press. When the platen 15 is in fully open position, the lever or switch 55 has contacted the finger 56, thereby closing the circuit 60 and operating valve 62 so as to admit pressure to the auxiliary cylinder 36 which causes downward movement of the ejector rod 46. In the meantime the discharge mechaism is operated, followed by the operation of valves 62 and 70 to vent cylinders 36 and 20, thus completing the operating cycle.

Figure 5:
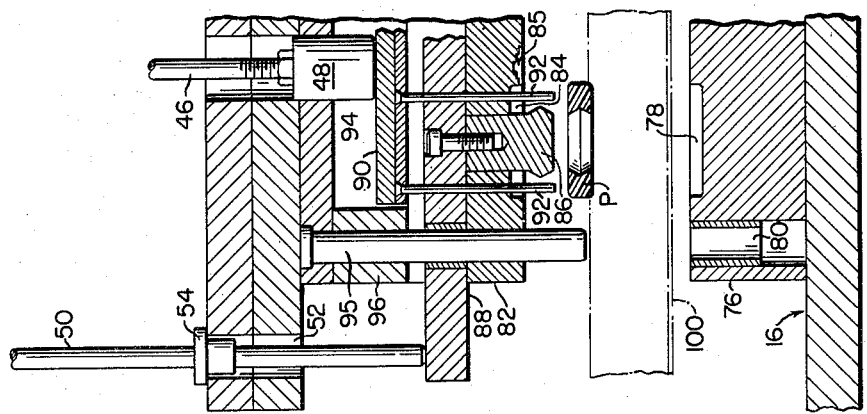
Fig. 5 is a view similar to Fig. 4, but showing the relationship of the parts after completion of the second stage ejection.
Figure 4:
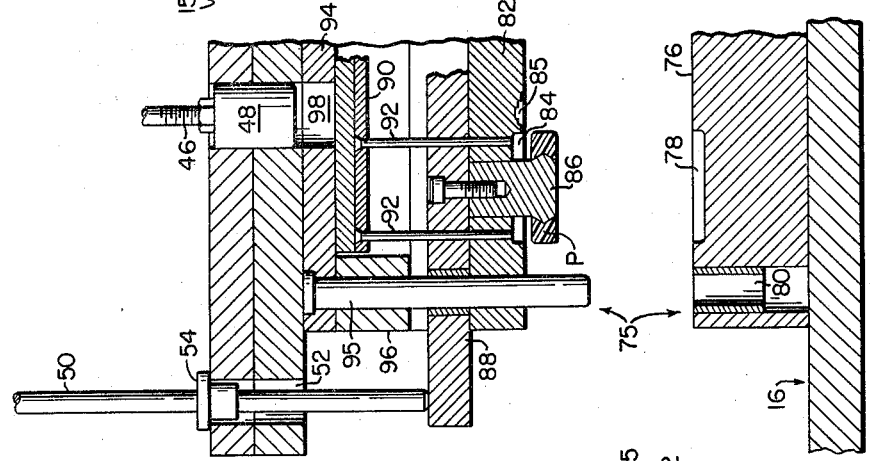
Fig. 4 is a view similar to Fig. 3, but showing the relationship of the parts at the end of the first stage ejection.
Figure 3:
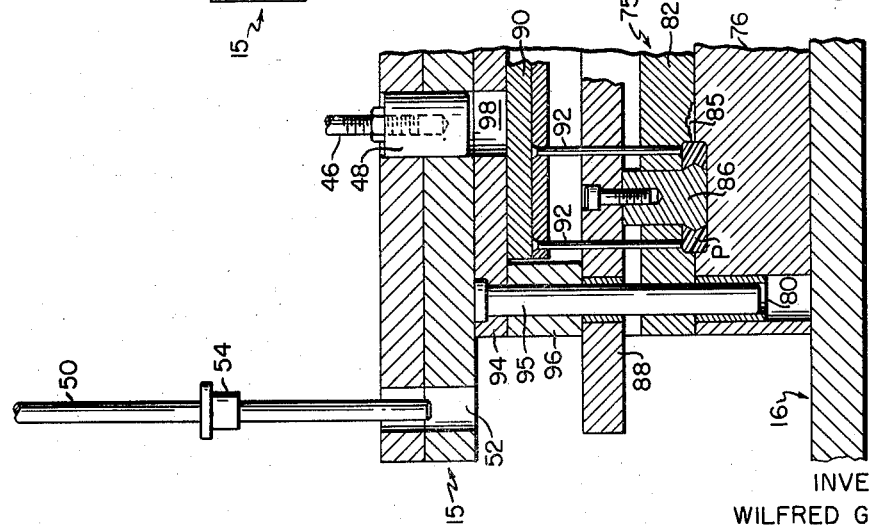
Fig. 3 is an enlarged vertical section through the platens and mold at the completion of the molding operation, but prior to the opening of the platens.

Referring to Figs. 3 to 5, the mold 75 is a two cavity type and comprises a base or lower section 76 suitably anchored to the fixed platen 16 and having a lower cavity 78 (Figs. 4 and 5) and a guide opening 80. The upper section 82 is formed with a companion cavity 84 communicating with a sprue groove 85, and a core member 86 is slidably mounted in an opening coaxial with the cavity 84. The first-stage stripper plate 88 is disposed above the upper section 82 and is secured to the vertically slidable core member 86. Above the plate 88 is a second stage stripper plate 90 provided with depending knockout pins 92 which extend through the plate 88 and section 82 into the mold cavity 84. A cap plate 94 carries a plurality of depending guide pins 95 which extend through spacer members 96, plate 88, section 82 into the guide openings 80, thus holding the parts in aligned position and permitting vertical movement of stripper plate 88 relative to the upper section 82. The cap plate 94 is also provided with an opening 98 registering with the enlarged end 48 of plunger 46 so as to permit the plunger to engage the plate 90. The entire assemblage of parts associated with the upper section 82 is suitably anchored to the upper platen 15 in conventional manner.

When the press is closed the parts are in the position shown in Figs. 1 to 3 and thermoplastic material is admitted through the sprue grooves to the mold cavity to form the part P, here shown as an annular member having a recessed inner periphery. When the platen 15 moves upwardly to open position, as shown in Fig. 4, the upper section 82 and associated parts are carried upwardly so that the stripper plate 88 first engages the ends of the rods 50 and when upward movement of the platen is arrested by the stops 54 the stripper plate 88 has been forced against the upper section 82 so that the core 86 is pushed outwardly carrying the molded part P, thus completing the first stage ejection. By this time the discharge pan 100 (Fig. 5) has moved into position beneath the upper section, as explained in my copending application Serial No. 395,472, and when the stripper plate 90 is depressed by plunger 46, the knockout pins 92 release the part P from the core 86, whereupon it drops onto the discharge pan 100, thus completing the second stage ejection.

Where the design of the mold is such that only a single stage stripping action is necessary or desirable, the plate 88 may be modified, if not eliminated, so that the stripping action is effected only by the action of the plunger 46 on the knockout pins 92.

A brief summary of the complete operation of the machine is as follows:

Assuming that an operating cycle has just been completed and the parts are in the position shown in Figs. 1 to 3, and that the discharge pan 100 (Fig. 5) has been retracted, the control switch is then operated (manually or by the retraction of the discharge pan) to send an impulse which resets and starts the timers which in turn govern the sequence of operations, the first of which is the operation of the feed plunger to force thermoplastic material into the mold cavity, after which the valve 70 is operated to admit fluid pressure to line 24 to elevate the piston 26 and associated parts, thereby opening the press.

As the platen 15 is carried upwardly the rods 50 operate the first-stage stripper plate 88, as shown in Fig. 4 and by this time the finger 56 has closed the switch 55 which effects operation of the valve 62 to admit fluid pressure into the line 38 to cause the piston 42 and rod 44 to move downwardly against the plunger 46, whereupon the latter operates the second stage stripper plate 90 to eject the part P onto the discharge pan 100 which has in the meantime moved into position.

The return movement of the discharge pan P closes a switch in the circuit 68 which causes the operation of valve 70 to admit fluid pressure into the line 25 and at the same time vent the line 24, whereupon the piston 26 operates to close the press. The closing movement of the press brings the two sections of the mold together as shown in Fig. 3, thus restoring the parts to original position and completing the operating cycle.

While I have shown and described one desirable embodiment of the invention it is to be understood that this disclosure is for the purpose of illustration and that various changes and modifications may be made without departing from the spirit and scope of the invention as set forth in the appended claims.

I claim:

1. A molding machine comprising a fixed platen, a movable platen having an ejector member arranged to act on the stripper of a mold carried thereby, a clamp cylinder having an operating piston and a tubular piston rod extending axially through and beyond each end of the clamp cylinder, one end of said tubular rod having a connection with said movable platen effective to reciprocate it in response to reciprocatory movement of said operating piston, an auxiliary cylinder coaxial with and mounted adjacent to the outer end of said clamp cylinder, a piston within said auxiliary cylinder having a rod extending into said tubular piston rod with its end engageable with said ejector member, and control means for admitting and discharging fluid pressure to and from the clamp and auxiliary cylinders.

2. A molding machine comprising a fixed platen, a movable platen having an ejector member arranged to act on the stripper of a mold carried thereby, a clamp cylinder having an operating piston and a tubular piston rod extending axially through and beyond each end of the clamp cylinder, the inner end of said tubular rod having a connection with said movable platen effective to reciprocate it in response to reciprocatory movement of said operating piston, an auxiliary cylinder coaxially with and mounted on the outer end of said tubular piston rod, a piston within said auxiliary cylinder having a rod extending into said tubular piston rod with its end engageable with said ejector member, and control means for admitting and discharging fluid pressure to and from the clamp and auxiliary cylinders.

3. A molding machine comprising a fixed platen, a movable platen for holding a mold provided with a stripper mechanism, a clamp cylinder having an operating piston and a tubular piston rod extending axially through and beyond each end of the clamp cylinder, the inner end of said tubular rod having a connection with said movable platen effective to reciprocate it in response to reciprocatory movement of said operating piston, an auxiliary cylinder coaxially with and mounted adjacent to the outer end of said clamp cylinder, a piston within said auxiliary cylinder having a rod extending into said tubular piston rod with its end engageable with an extension projecting through said movable platen so as to engage the stripper mechanism of a mold carried thereby, and control means for admitting and discharging fluid pressure to and from the clamp and auxiliary cylinders.

4. A molding machine comprising a fixed platen, a movable platen for holding a mold having a two-stage stripper mechanism, fixed stop means engageable with the stripper mechanism to effect the first-stage stripping action as said movable platen is moved to open position, a clamp cylinder having an operating piston and a tubular piston rod extending axially through and beyond the ends of the clamp cylinder, the inner end of said tubular piston rod having a connection with said movable platen effective to reciprocate it in response to reciprocatory movement of said operating piston, an auxiliary cylinder coaxial with and mounted adjacent to the outer end of said clamp cylinder, a piston within said auxiliary cylinder having a rod extending into said tubular piston rod with its end engageable with an extension projecting through said movable platen so as to engage the stripper mechanism and effect the second stage stripping action, and control means for admitting and discharging the fluid pressure to and from the clamp and auxiliary cylinders.

5. A molding machine comprising a fixed platen, a movable platen for holding a mold having a two-stage stripper mechanism, fixed stop means engageable with the stripper mechanism to effect the first-stage stripping action as said movable platen is moved to open position, a clamp cylinder having an operating piston and a tubular piston rod extending axially and beyond the ends of the clamp cylinder, the inner end of said tubular piston rod having a connection with said movable platen effective to reciprocate it in response to reciprocatory movement of said operating piston, an auxiliary cylinder coaxial with and mounted adjacent to the outer end of said clamp cylinder, a piston within said auxiliary cylinder having a rod extending into said tubular piston rod with its end engageable with an extension projecting through said movable platen so as to engage the stripper mechanism and effect the second stage stripping action, and control means for successively admitting fluid pressure to the outer end of said clamp cylinder to close said movable platen, admitting fluid pressure to the inner end of said clamp cylinder to open said movable platen, and admitting fluid pressure to the outer end of said auxiliary cylinder when said movable platen is open thereby to operate said ejector piston.

6. A molding machine comprising a fixed platen, a movable platen for holding a mold having a two-stage stripper mechanism, fixed stop means engageable with the stripper mechanism to effect the first-stage stripping action as said movable platen is moved to open position, an ejector member mounted on said movable platen and operative when depressed to effect the second-stage stripping action, a clamp cylinder having an operating piston and a tubular piston rod extending axially through and beyond each end of the clamp cylinder, the inner end of said tubular piston rod having a connection with said movable platen effective to reciprocate it in response to reciprocatory movement of said operating piston, said ejector having an extension projecting into the inner end of said tubular piston rod, an auxiliary cylinder coaxial with and mounted adjacent to the outer end of said clamp cylinder, a piston within said auxiliary cylinder having a rod extending into said tubular piston rod with its end engageable with said extension, and control means for successively admitting fluid pressure to the outer end of said clamp cylinder to close said movable platen, admitting fluid pressure to the inner end of said clamp cylinder to open said movable platen, and admitting fluid pressure to the outer end of said auxiliary cylinder when said movable platen is open thereby to operate said ejector piston.

References Cited in the file of this patent

UNITED STATES PATENTS

| | | |
|---|---|---|
| 2,298,044 | Dinzl | Oct. 6, 1942 |
| 2,330,369 | Marsh | Sept. 28, 1943 |
| 2,395,100 | Caron | Feb. 19, 1946 |
| 2,465,204 | Dalton | Mar. 22, 1949 |
| 2,483,093 | Harvey | Sept. 27, 1949 |
| 2,569,174 | Kardorff | Sept. 25, 1951 |
| 2,657,429 | Faust | Nov. 3, 1953 |